Sept. 12, 1950      T. L. DUGAN      2,521,969

ELECTRICAL BOOSTER STARTING SYSTEM

Filed Feb. 28, 1948      3 Sheets-Sheet 1

INVENTOR.
Thomas L. Dugan.
BY Bain & Freeman
Att'ys.

Sept. 12, 1950        T. L. DUGAN        2,521,969
ELECTRICAL BOOSTER STARTING SYSTEM
Filed Feb. 28, 1948        3 Sheets-Sheet 2
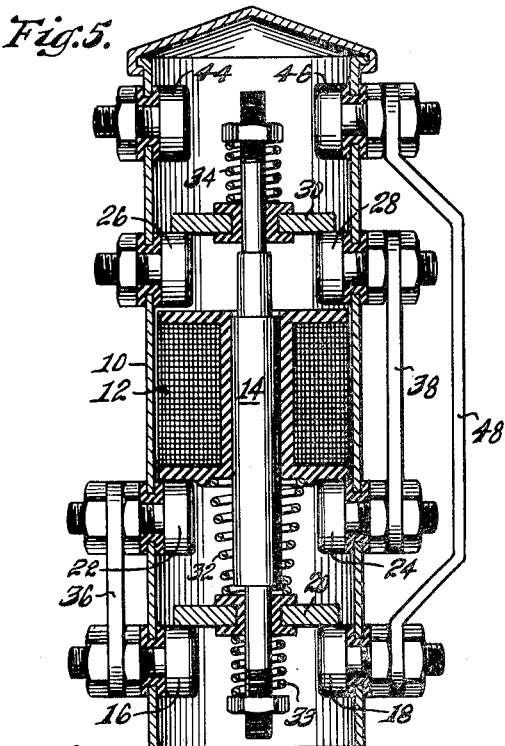
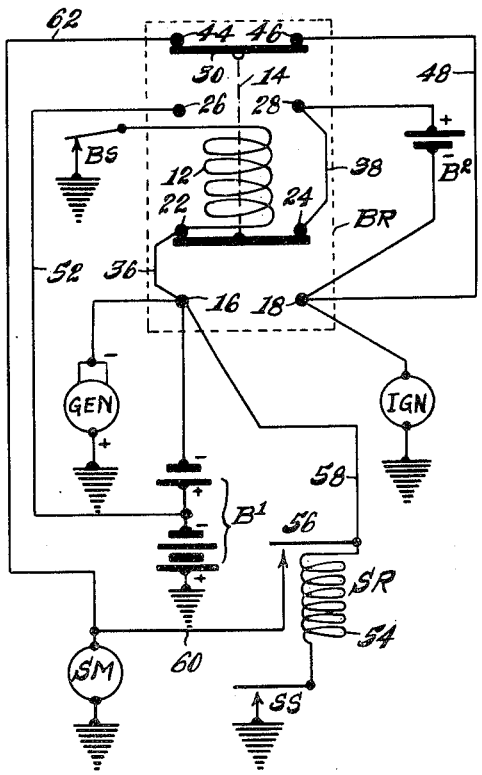
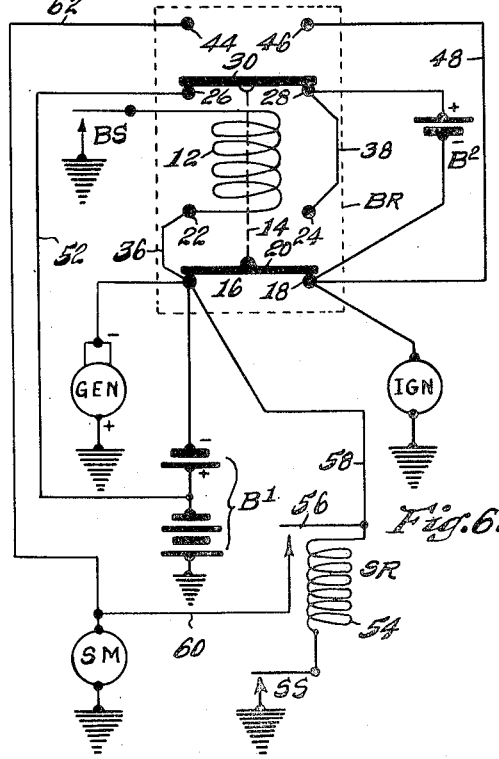
INVENTOR.
Thomas L. Dugan.
BY Bair & Freeman
Att'ys.

Sept. 12, 1950 — T. L. DUGAN — 2,521,969
ELECTRICAL BOOSTER STARTING SYSTEM
Filed Feb. 28, 1948 — 3 Sheets-Sheet 3
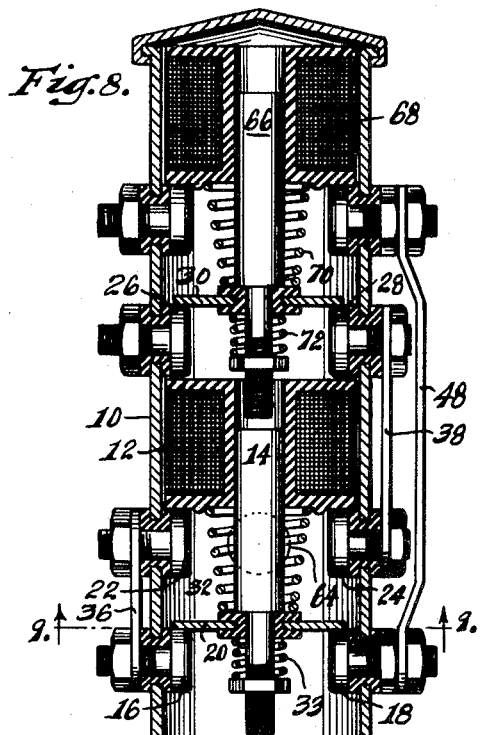
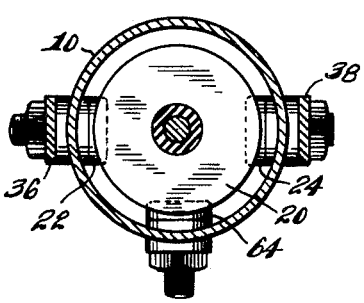
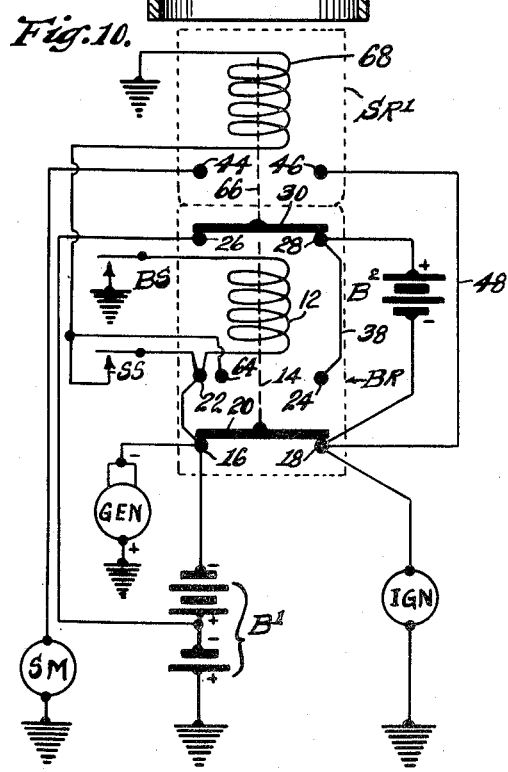
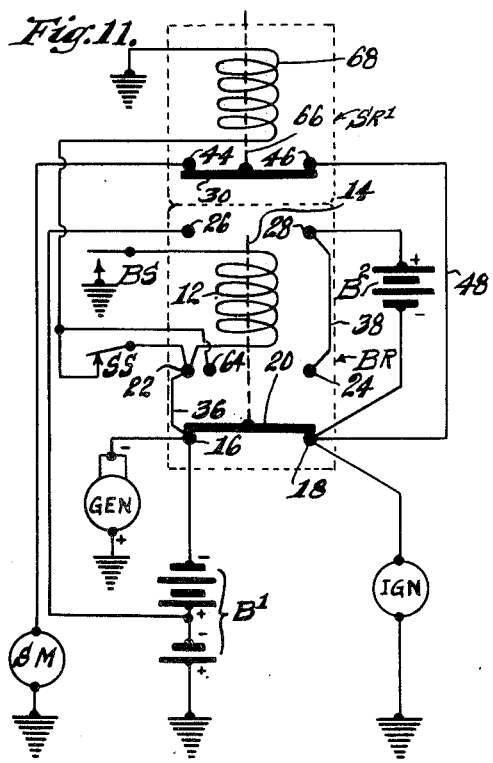
INVENTOR.
Thomas L. Dugan.
BY Bair & Freeman
Att'ys.

Patented Sept. 12, 1950

2,521,969

UNITED STATES PATENT OFFICE 2,521,969

ELECTRICAL BOOSTER STARTING SYSTEM

Thomas L. Dugan, Sioux City, Iowa

Application February 25, 1948, Serial No. 12,121

14 Claims. (Cl. 290—37)

This invention relates to a booster starting system of the electrical type, that is a system for starting internal combustion or Diesel engines or the like by means of an electric starter motor energized from a storage battery or other suitable source of current.

One object of the invention is to provide a booster starting system wherein the voltage of the normal starting battery is boosted by means of a second or reserve battery whenever desired, such as when the normal starting battery is unsuccessful to quickly start the engine in cold weather.

Another object is to provide a second or reserve battery together with a switching system and a circuit for connecting the switching system with the starter motor, starter battery, generator, ignition and other electric accessories of an automobile or the like so that one switch or control device may be used for starting the engine in the normal manner from a standard starting battery and another switch or control device may be used in an emergency to cut a reserve battery into series with the normal battery thereby increasing the voltage available for the starter motor to speed up and increase the power of the starting motor so as to insure starting of the engine in a minimum of time and regardless of weather conditions and particularly low temperatures.

Still another object is to also supply the boosted voltage to the ignition mechanism of the engine during the starting operation so that a hotter spark at the spark plug points is had for starting, the switching means being such that when released upon the engine starting it will return the circuits to normal position for the regular six volt supply of current from the usual battery to the ignition mechanism and to the starter motor when it is subsequently started in the usual manner by using the regular starter switch instead of the booster starter switch.

A further object is to provide a switching arrangement which includes a solenoid for operating switch contacts, the arrangement being such that a single solenoid can be provided to accomplish most of the desired results and the switch contacts being so actuated by the solenoid that there is no possibility of shorting the battery or any portion thereof as a result of sticking contacts or other maloperation of the switching mechanism.

Still a further object is to provide a switching arrangement which can use a reserve battery of six volts normally in parallel with the usual starting battery but connected in series therewith when the booster switch is closed, the switch being capable of being designed for using a two-volt cell or a four-volt battery as a reserve source of current supply.

An additional object is to provide circuit arrangements which charge the two-volt cell or the four-volt battery in parallel with one or two cells respectively of the normal starting battery after the booster starter operation has been completed, the reserve battery being thereby kept fully charged the same as the normal battery (both of the batteries in parallel if they are both of the six-volt size). Upon closure of the booster switch, the voltage supplied to the starter motor then becomes 8, 10 or 12 volts as the case may be because of the switching arrangement connecting the normal battery and the reserve battery in series with each other.

Another additional object is to provide modified forms of the invention in which two separate switches are provided, one being the normal starting switch and the other the booster switch operable independent of each other, a somewhat simpler circuit arrangement in which booster operation is had without depression of both the normal starter switch and the booster switch, and a two solenoid arrangement in which the two solenoids are provided to insure proper contact operation, the parts however being so mechanically interlocked that during booster operation it is impossible for the normal starting contacts to remain closed and cause short-circuiting of the battery or any portion thereof.

Figure 1:
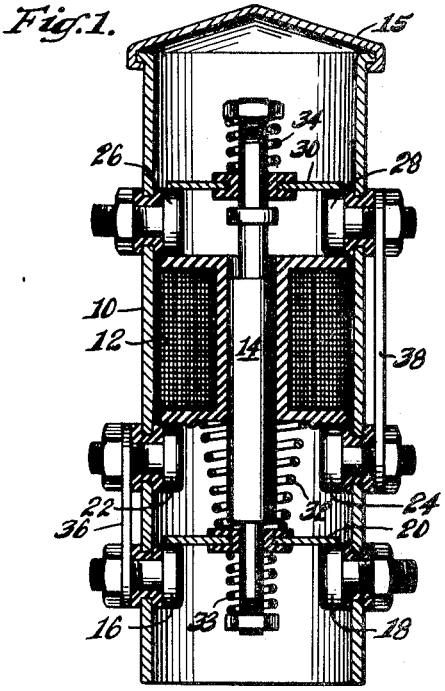
Figure 1 is a sectional view through a booster relay which is solenoid operated and discloses the simplest form of my invention having but a single solenoid and a minimum of contacts.

With these and other objects in view, my invention consists in the construction, arrangement and combination of the various parts thereof whereby the objects contemplated are attained, as hereinafter more fully set forth, pointed out in my claims and illustrated in the accompanying drawings, wherein:

Figure 5 is a sectional view similar to Figure 1 showing a modification in which additional contacts are used in the booster relay to eliminate the necessity of pressing both a normal starter switch and a booster switch during a booster operation as in the arrangement shown in Figures 1 to 4.

Figure 6 is an electro-diagrammatic view of the circuit for the booster relay of Figure 5 showing the normal position.

Figure 7 is a similar view of the circuit showing the operated position.

Figure 8 is a sectional view similar to Figures 1 and 5 showing a further modification utilizing two solenoids in the booster relay of Figure 5.

Figure 9 is a sectional view on the line 9—9 of Figure 8, and

Figures 10 and 11 are circuit diagrams using the booster relay of Figure 8 and showing the normal and operated positions.

*Description of Figures 1 to 4*

Figure 2:
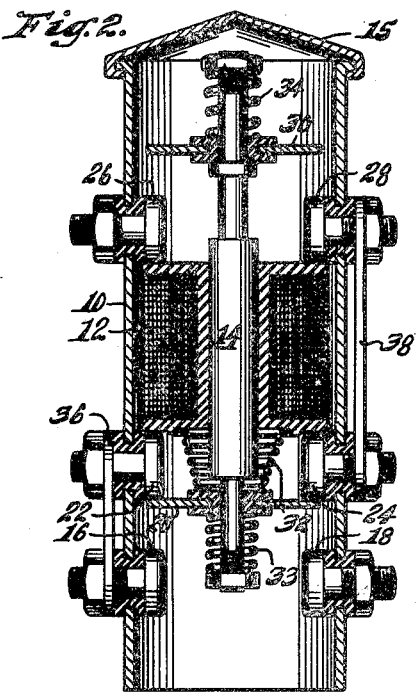
Figure 2 is a similar sectional view showing the booster relay in operated position.

On the accompanying drawings I have used the reference character BR to indicate in general a booster relay. The relay BR consists of a tubular casing 10 having therein a solenoid coil 12 for lifting a plunger 14 and operating switching mechanism as follows: Contacts 16 and 18 are normally bridged by a bridging contact 20. The contact 20 is adapted at times to bridge other contacts 22 and 24 as shown in Figure 2. In the normal position of Figure 1 two other contacts 26 and 28 are bridged by a bridging contact 30. The contacts 16, 18, 22, 24, 26 and 28 are combined contacts and terminals suitably insulated relative to the casing 10.

The bridging contact 20 is slidable on the lower end of the plunger 14 and suitably insulated therefrom and is constrained toward the contacts 16 and 18 by a return spring 32. The bridging contact 30 is slidable on the upper end of the plunger 14, is insulated from the plunger and is constrained to engage the contacts 26 and 28 by a spring 34. The contact 20 is similarly constrained to engage the contacts 22 and 24 in the operated position of the booster relay by a spring 33. These springs are provided for the purpose of insuring contact engagement and they compensate for slight variations in dimensions in an obvious manner.

The contact terminals 16 and 22 are electrically connected together by a copper strap 36 and the contact terminals 24 and 48 are similarly connected together by a copper strap 38 for establishing circuits between the respective contacts.

Figure 3:
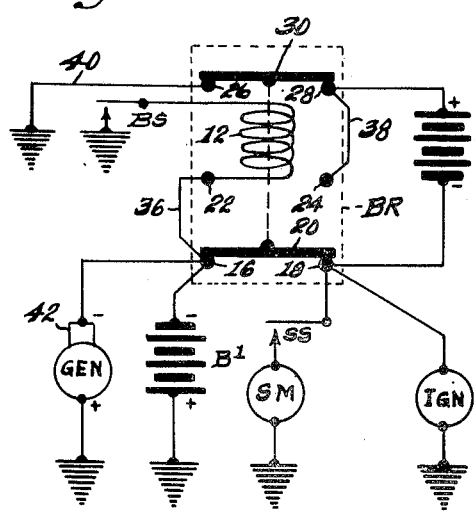
Figure 3 is a circuit diagram for an electrical booster starting system using the booster relay of Figure 1 and showing the parts in normal position.
Figure 4:
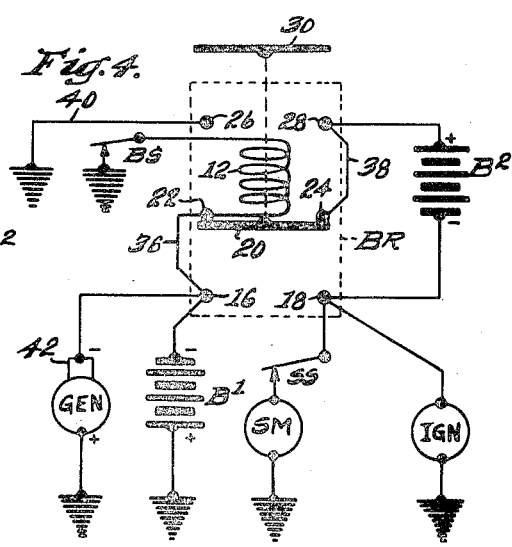
Figure 4 is a similar circuit diagram showing the circuit when the booster switch is closed and the booster relay thereby operated.

The booster relay of Figure 1 is connected in an electrical circuit as disclosed in Figure 3. The normal starting battery is shown at $B^1$, the starter motor at SM, the generator at GEN, the ignition at IGN and the normal starter switch at SS. In addition to these elements I provide a reserve battery $B^2$ and a booster switch BS so that my complete system added to the normal electrical system of an automobile or the like consists of the booster relay BR, the battery $B^2$ and the booster switch BS.

The ungrounded side of the generator GEN and the normal starting battery $B^1$ are connected to the terminals 16. The starter switch SS and the ignition circuit IGN are connected with the contacts 18. The contact 26 is grounded by means of a wire 40 and the solenoid 12 has one end connected to the contact 22 and its other end connected to the booster switch BS.

The reserve battery $B^2$ is connected across the contacts 18 and 28, the terminals of similar polarity of the batteries $B^1$ and $B^2$ being connected to the contacts 16 and 18 to insure proper polarity in the circuits that are established both normally and during booster starting operations.

*Practical operation of Figures 1 to 4*

In the operation of this form of my invention referring to Figure 3 with the parts in normal position the normal battery $B^1$ supplies current for the ignition and for the starter motor. The generator provided with the usual cutout indicated at 42 can charge the battery $B^1$ in the normal manner. At the same time it charges the battery $B^2$ from the cutout 42 through the elements 16, 20 and 18, the return line to the ground being through elements 28, 30, 26 and 40. In this way the reserve battery $B^2$ is kept up to full charge without any attention on the part of the operator of the automobile.

When the starter motor SM is to be started in the normal manner, that is from the battery $B^1$ alone, the starting switch SS is closed for establishing a circuit from the battery $B^1$ through elements 16, 20 and 18 to the starter motor with the return circuit through ground.

If the battery $B^1$ does not start the engine, or if the weather is cold and the operator desires to use the booster starting system without first trying the regular starting system, the booster switch BS is first closed which furnishes current from the battery $B^1$ through elements 16, 36 and 22 to the solenoid coil 12 with return to ground through the booster switch. The solenoid coil 12 now being energized lifts the plunger 14 so that the parts assume the position shown in Figures 2 and 4. The starter motor will now receive current from the batteries $B^1$ and $B^2$ in series and the starter motor operates when the starter switch SS is subsequently closed. The circuit may then be traced from the battery $B^1$ through the elements 16, 36, 22, 20, 24, 38 and 28 to the battery $B^2$ and from this battery through the contact 18 and the switch SS to the starting motor.

Since the batteries $B^1$ and $B^2$ are in series, 12 instead of 6 volts will be delivered to the starter motor. These starter motors are designed to withstand a considerable overload for a short but reasonable length of time and the 12 volts accordingly will not injure them unless they are energized for a prolonged period at that voltage. Ordinarily even in the coldest weather if six volts do not start the engine 8 volts are sufficient to do so and will start it relatively quickly especially with the ignition connected to the terminal 18 so that the ignition coil also receives 12 volts, thereby producing a hotter spark at the spark plug points.

The arrangement in Figures 1 to 4 is such that a single solenoid accomplishes the desired purpose and insures against any possibility of either the normal battery or the reserve battery being shorted as when independent relays are used for the contacts 20 and 30. For instance, if the contact 20 were to engage the contacts 22 and 24 without the contact 30 leaving the contacts 26 and 28 the battery $B^1$ would be shorted to ground through the elements 36, 22, 20, 24, 38, 28, 30, 26 and 40. By having the contacts 20 and 30 mounted on the same plunger 14 any possibility of circuit failure of this character is entirely eliminated.

The construction of the booster relay BR is also such that it can be made of standard parts, the casing 10 being made of tubing, the solenoid coil 12 being the usual relay coil used in connection with normal starting systems where the starting switch SS is replaced by a starter relay having such a solenoid coil and the coil being controlled by a starter push button on the instrument panel of the automobile.

Description of Figures 5, 6 and 7

In Figure 5 I show a modification wherein many of the elements of the same character as in the previous figures bear the same reference numerals. In addition to the contacts thus far enumerated two additional contacts 44 and 46 are provided and a strap 48 connects the terminal 18 with the terminal 46.

The circuit for the booster relay of Figure 5 is in parallel with the reserve battery B². The contacts 44 and 46 then constitute a starter switch in conjunction with the bridging contact 30 when it is raised to the position of Figure 7 as will hereinafter appear.

The circuit in Figures 6 and 7 is shown in connection with a starter relay SR having a coil 54 and a starter switch 56. The coil and the switch are connected by a wire 58 with the contact 16 and the switch is then connected by a wire 60 to the starter motor. A starter switch SS is arranged to control the energization of the coil 54 of the starter relay SR.

The circuit shown in Figure 6 differs from Figure 3 in that the reserve battery B² is a single cell and accordingly the contact 26 instead of being grounded as in Figure 3 is connected by a wire 52 with an intermediate tap of the regular battery B¹ so that in the normal position of the booster relay the upper cell only of the battery B¹ is connected in parallel with the battery B².

Practical operation of Figures 5, 6 and 7

In the normal position of Figure 6 the upper cell of the battery B¹ and the cell B² being connected in parallel are both properly charged from the generator (which is designed for charging a 6 volt battery) since the two cells in parallel are in series with the 4 volt section (lower two cells) of the battery B¹.

During normal starting operations when the starter motor SM is energized with 6 volts only the starter switch SS is closed for energizing the coil 54 from the battery B¹ thereby closing the starter motor switch 56 so that current to the starter motor may be traced from the battery B¹ through 16, 58, 56 and 60.

For emergency starting the booster switch BS only is closed and energizes the solenoid coil 12 thereby positioning the parts of the booster relay as illustrated in Figure 7. The circuit may now be traced from the upper terminal of the battery B¹ through 36, 22, 20, 24, 38, 26 to the battery B² and from it through 18, 48, 46, 30, 44 and a wire 62 to the starter motor SM. Thus the cell B² is in series circuit with, and has proper polarity in relation to the battery B¹ to furnish 8 volts for starting and also for ignition. In many instances this additional two volts is sufficient for all emergencies and of course reduces the size of the reserve battery so that two full size batteries as in Figure 3 need not be used.

Description of Figures 8, 9, 10 and 11

The booster relay of Figure 8 is actually a combination booster relay and starter relay, the lower section being indicated at BR and the upper section SR¹ for convenience in general reference to the device. The same contact arrangement already described in connection with Figure 5 is carried over to Figure 8 with the addition of a ninth contact 64 the purpose of which will hereinafter appear.

The solenoid coil 12 and plunger 14 are again provided but instead of the bridging contact 30 being carried by this plunger it is carried by a second plunger 66. A second solenoid 68 is provided for lifting this plunger when the second solenoid coil is energized. A return spring 70 is provided for the plunger 66 and the bridging contact 30 is slidably mounted on the plunger 66 and backed by a spring 72.

Referring to the circuit for this type of booster relay and starter relay the normal position is shown in Figure 10 wherein the reserve battery B² is illustrated as one of the 4-volt type. The intermediate tap to the main battery B¹ connects the upper two cells thereof in parallel with the reserve battery B² during normal charging operations when the circuits are established as in Figure 10.

Practical operation of Figures 8, 9, 10 and 11

The normal circuit arrangement as shown in Figure 10 causes the generator to furnish current for charging the batteries B¹ and B², and the ignition mechanism and other accessories of the automobile are supplied with 6-volt current. When the starter switch SS is closed as in Figure 11 the solenoid 68 is energized, receiving current from the terminal 22 and therefore from the minus terminal of the battery B¹. The coil 68 attracts the plunger 66 for raising the bridging contact 30 without raising the contact 20 and accordingly a starter circuit is established from the minus terminal of the normal or main battery B¹ through the elements 16, 20, 18, 48, 46, 30 and 44. The reserve battery B² at this time is cut out of the generator circuit by reason of the contact 30 leaving the contacts 26 and 28.

If, instead of 6 volts, 10 volts are desired for the starting operation then the booster switch BS is closed instead of the starter switch SS. This results in a circuit being established through the solenoid 12 from the minus terminal of the battery B¹ so that the bridging contact 20 is lifted to engage the contacts 22 and 24. The plunger 14 also raises the plunger 66 by reason of the upper end of 14 engaging the depending stem from 66 so that the bridging contact 30 is raised into engagement with the contacts 44 and 46.

The circuit to the starter motor may now be traced through 16, 36, 22, 20, 24, 38, 26, B², 18, 48, 46, 30 and 44. In this instance the batteries B¹ and B² are in series with each other so that a total of 10 volts is supplied to the starter motor and likewise to the ignition mechanism which takes its current off at the terminal 18.

When the contact 20 engages contacts 22 and 24 it also engages a contact 64 which furnishes current from the battery B¹ through the solenoid 68 in addition to the solenoid 12, thus permitting 68 to help 12 by drawing the plunger 66 upwardly by electromagnetic attraction.

From the foregoing description it will be obvious that I have provided a simple switching system for furnishing additional voltage to the starter motor when desirable or necessary. At the same time the system provides for proper recharging of the reserve battery as well as the main battery of the automobile.

Some changes may be made in the construction and arrangement of the parts of my system without departing from the real spirit and purpose of my invention, and it is my intention to cover by my claims any modified forms of structure or use of mechanical equivalents which may be reasonably included within their scope.

I claim as my invention:

1. In an electrical booster starter system, a booster relay including a pair of normally closed switches and a normally open switch, a reserve battery connected through said normally closed switches with a generator to be charged therefrom, a booster switch for energizing said booster relay for thereby opening said normally closed switches and closing said normally open switch, said normally open switch being connected between a main battery terminal of one of said normally closed switches and one of the contacts of said other normally closed switch which latter contact is connected with one terminal of the reserve battery of opposite polarity, whereby when said booster relay is operated said main and reserve batteries are connected in series for furnishing current to the starter motor.

2. In an electrical booster starter system, a booster relay including a pair of normally closed switches and a normally open switch, a reserve battery connected through said normally closed switches with a generator to be charged therefrom, a booster switch for energizing said booster relay for thereby opening said normally closed switches and closing said normally open switch, said normally open switch being connected between a main battery terminal of one of said normally closed switches and one of the contacts of said other normally closed switch which latter contact is connected with one terminal of the reserve battery of opposite polarity, whereby when said booster relay is operated said main and reserve batteries are connected in series for furnishing current to the starter motor, and a starter switch in the circuit of said starter motor for completing the booster circuit.

3. In an electrical booster starter system for an engine, a booster relay including a pair of normally closed switches and a normally open switch, a reserve battery connected through said normally closed switches with a generator driven by the engine to be charged from said generator, a booster switch for energizing said booster relay for thereby opening said normally closed switches and closing said normally open switch, said normally open switch being connected between a main battery terminal and a reserve battery terminal of opposite polarity, whereby when said booster relay is operated said main battery is connected in series with said reserve battery for furnishing current to the starter motor, the ignition mechanism of the engine being connected in parallel with the starting motor by said relay when operated to be also energized by said batteries in series.

4. In an electrical booster starting switch of the character disclosed, a booster relay having a pair of normally closed switches and a normally open switch, one terminal of the main starting battery being connected to one terminal of one of said normally closed switches, the other terminal of said one of said normally closed switches being connected with a terminal of the same polarity of a reserve battery, the other terminal of said reserve battery being connected with one terminal of the other of said normally closed switches and the other terminal of said other of said normally closed switches being connected to the remaining terminal of said main starting battery, said normally open switch when closed establishing a circuit across the first mentioned contacts of each of said normally closed switches, and a booster switch operable to energize said booster relay.

5. In an electrical booster starting switch of the character disclosed, a booster relay having a pair of normally closed switches and a normally open switch, one terminal of the main starting battery being connected to one terminal of one of said normally closed switches, the other terminal of said one of said normally closed switches being connected with a terminal of the same polarity of a reserve battery, the other terminal of said reserve battery being connected with one terminal of the other of said normally closed switches and the other terminal of said other of said normally closed switches being connected to the remaining terminal of said main starting battery, said normally open switch when closed establishing a circuit across the first mentioned contacts of each of said normally closed switches, a booster switch operable to energize said booster relay, and a starter switch in the circuit between said relay and a starter motor to complete the circuit through the windings thereof.

6. In an electrical booster starting switch of the character disclosed, a booster relay having a pair of normally closed switches and a normally open switch, one terminal of the main starting battery being connected to one terminal of one of said normally closed switches, the other terminal of said one of said normally closed switches being connected with a terminal of the same polarity of a reserve battery, the other terminal of said reserve battery being connected with one terminal of the other of said normally closed switches and the other terminal of said other of said normally closed switches being connected to the remaining terminal of said main starting battery, said normally open switch when closed establishing a circuit across the first mentioned contacts of each of said normally closed switches, a booster switch operable to energize said booster relay, a starter switch in the circuit between said relay and a starter motor to complete the circuit through the windings thereof, and a starter relay, said starter switch being closed by operation of said starter relay.

7. In an electrical booster starting system, a booster relay having an energizing coil and a pair of normally closed switches and a normally open switch, one terminal of the main starting battery being connected to one terminal of one of said normally closed switches, the other terminal of said one of said normally closed switches being connected with a terminal of the same polarity of a reserve battery, the other terminal of said reserve battery being connected with one terminal of the other of said normally closed switches and the other terminal of said other of said normally closed switches being connected to the remaining terminal of said main starting battery, said normally open switch when closed establishing a circuit across the first mentioned contacts of each of said normally closed switches, a booster switch operable to energize said booster relay, said relay including a starter switch closed by operation of the relay, a second energizing coil in said relay and a switch for energizing said second relay coil for closing said starter switch only and thereby energizing the starter motor from only said main battery.

8. In an electrical booster starting switch of the character disclosed, a booster relay having a pair of normally closed switches and a normally open switch, one terminal of the main starting battery being connected to one terminal of one of said normally closed switches, the other terminal of said one of said normally closed switches being connected with a terminal of the same polarity of a reserve battery, the other terminal of said reserve battery being connected with one terminal of the other of said normally closed switches and the other terminal of said other normally closed switch being connected to the remaining terminal of said main starting battery, said normally open switch when closed establishing a circuit across the first mentioned contacts of each of said normally closed switches, and a booster switch operable to energize said booster relay, said booster relay having a second normally open switch connected in the circuit of said starting motor and operable when closed to complete the starting motor circuit.

9. In an electrical booster starting switch of the character disclosed, a booster relay having a pair of normally closed switches and a normally open switch, one terminal of the main starting battery being connected to one terminal of one of said normally closed switches, the other terminal of said one of said normally closed switches being connected with a terminal of the same polarity of a reserve battery, the other terminal of said reserve battery being connected with one terminal of the other of said normally closed switches and the other terminal of said other normally closed switch being connected to the remaining terminal of said main starting battery, said normally open switch when closed establishing a circuit across the first mentioned contacts of each of said normally closed switches and a booster switch operable to energize said booster relay, said booster relay having a second normally open switch connected in the circuit of said starting motor and operable when closed to complete the starting motor circuit, a starter relay operable independent of said booster relay to close the circuit to said starter motor from said main starting battery only, said booster relay having a mechanical connection with said starter relay to close the same, and a starter switch for said starter relay.

10. In an electrical booster relay, a pair of normally closed switches and a normally open switch, one terminal of the main starting battery being connected to one terminal of one of said normally closed switches, the other terminal thereof being connected with a starter motor and a terminal of the same polarity of a reserve battery, the other terminal of said reserve battery being connected with one terminal of the other of said normally closed switches and the other terminal of said other normally closed switch being connected to the remaining terminal of said main starting battery, said normally open switch when closed establishing a circuit across the first mentioned contacts of each of said normally closed switches, a booster switch operable to energize said booster relay, said booster relay having a second normally open switch connected in the circuit of said starter motor and operable when closed to complete the starting motor circuit, a starter relay operable independent of said booster relay to close the circuit to said starter motor from said main starting battery only, a starter switch for energizing said starter relay, said booster relay having mechanical connection with said starter relay to close the same, and a contact engaged by one of said normally closed switches to establish a shunt circuit around said starter switch.

11. In an electrical booster system for internal combustion engines, automobiles and the like, a booster relay having an energizing coil and six contacts, a bridging contact normally engaging the first and second contacts and movable to engage the third and fourth contacts when the relay is energized, a second bridging contact normally engaging the fifth and sixth contacts and disengaging them when the relay is energized, a reserve battery connected across said second and sixth contacts, a main battery connected across said first and fifth contacts with the polarity of said batteries being the same at the first and second contacts, a generator connected with said first contact, a starter motor connected with said second contact, the circuit thereof including a starter switch, said first and third, and fourth and sixth contacts being connected together, a booster switch operable to energize said relay, and ignition mechanism connected with said second contact.

12. In an electrical booster system for internal combustion engines, automobiles and the like, a booster relay having an energizing coil and six contacts, a bridging contact normally engaging the first and second contacts and movable to engage the third and fourth contacts when the relay is energized, a second bridging contact normally engaging the fifth and sixth contacts and disengaging them when the relay is energized, a reserve battery connected across said second and sixth contacts, a main battery connected across said first and fifth contacts with the polarity of said batteries being the same at the first and second contacts, a generator connected with said first contact, a starter motor connected with said second contact, said first and third, and fourth and sixth contacts being connected together, and a booster switch operable to energize said relay.

13. In an electrical booster system for an internal combustion engine, a booster relay having an energizing coil and eight contacts, a bridging contact normally engaging the first and second contacts and movable to engage the third and fourth contacts when the relay is energized, a second bridging contact normally engaging the fifth and sixth contacts and disengaging them when the relay is energized, a reserve battery connected across said second and sixth contacts, a main battery connected across said first and fifth contacts with the polarity of said batteries being the same at the first and second contacts, a generator connected with said first contact, said first and third, and fourth and sixth contacts being connected together, a booster switch operable to energize said relay, said relay including seventh and eighth contacts engaged by said second bridging contact when said relay is energized, a starter motor connected with said seventh contact, said seventh and eighth contacts being connected in the circuit between said second contact and said starter motor, and the ignition mechanism for said engine being connected with said second contact.

14. In an electrical booster system for internal combustion engines, a booster relay having an energizing coil and eight contacts, a bridging contact normally engaging the first and second contacts and movable to engage the third and fourth contacts when the relay is energized, a second bridging contact normally engaging the fifth and sixth contacts and movable to engage the seventh and eighth contacts when the relay is energized, a reserve battery connected across said second and sixth contacts, a main battery connected across said first and fifth contacts with the polarity of said batteries being the same at the first and second contacts, a generator connected with said first contact, said first and third, and fourth and sixth contacts being connected together, a booster switch operable to energize said relay, a starter motor connected with said seventh contact, said seventh and eighth contacts being connected in the circuit between said second contact and said starter motor, a second energizing coil for said relay and a starter switch for energizing the same, said second coil when energized engaging said second bridging contact with said seventh and eighth contacts for energizing said starting motor from the main battery only.

THOMAS L. DUGAN.

REFERENCES CITED

The following references are of record in the file of this patent:

UNITED STATES PATENTS

| Number | Name | Date |
|---|---|---|
| 1,067,631 | Woodbridge | July 15, 1913 |
| 1,192,400 | Edison | July 25, 1916 |
| 1,288,938 | Leonard | Dec. 24, 1918 |
| 1,400,856 | Bliss | Dec. 20, 1921 |
| 1,898,370 | Hughes et al. | Feb. 21, 1935 |
| 2,044,917 | Richardson | June 23, 1936 |
| 2,066,010 | Lindem | Dec. 29, 1936 |
| 2,096,378 | Mitchell | Oct. 19, 1937 |
| 2,152,405 | Dreischerf | Mar. 29, 1939 |
| 2,344,568 | Snyder | Mar. 21, 1944 |

FOREIGN PATENTS

| Number | Country | Date |
|---|---|---|
| 246,885 | Italy | Apr. 29, 1926 |